United States Patent
Gupta

(10) Patent No.: US 6,901,174 B2
(45) Date of Patent: May 31, 2005

(54) DEVICE AND METHOD FOR MULTIPLICATION OF REPETITION FREQUENCY IN OPTICAL PULSE TRAINS

(75) Inventor: Kamal Kant Gupta, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 173 days.

(21) Appl. No.: 10/384,564

(22) Filed: Mar. 11, 2003

(65) Prior Publication Data

US 2003/0174379 A1 Sep. 18, 2003

(30) Foreign Application Priority Data

Mar. 14, 2002 (JP) ........................................ 2002-070036

(51) Int. Cl.[7] .......................... G02F 1/01; H04B 10/04; H04B 10/12; H01S 3/081
(52) U.S. Cl. ..................... 385/1; 385/2; 385/5; 385/24; 385/31; 398/183; 398/186; 398/187; 372/93; 372/94; 372/97; 359/334; 359/341.1; 359/346
(58) Field of Search ............................... 385/1, 2, 3, 4, 385/5, 24, 42, 31, 32, 39, 40, 41, 14; 398/182, 183, 186, 187, 189, 190; 372/93, 94, 97; 359/334, 341.1, 341.3, 346

(56) References Cited

U.S. PATENT DOCUMENTS

| | | | | |
|---|---|---|---|---|
| 5,432,631 A | * | 7/1995 | Mamyshev | 398/188 |
| 5,519,526 A | * | 5/1996 | Chua et al. | 398/139 |
| 5,646,774 A | * | 7/1997 | Takara et al. | 359/340 |
| 5,778,016 A | * | 7/1998 | Sucha et al. | 372/38.1 |
| 5,822,103 A | * | 10/1998 | Boroson | 398/189 |
| 6,081,355 A | * | 6/2000 | Sharma et al. | 398/90 |
| 6,396,856 B1 | * | 5/2002 | Sucha et al. | 372/25 |
| 6,532,091 B1 | * | 3/2003 | Miyazaki et al. | 398/175 |
| 2001/0053008 A1 | * | 12/2001 | Ueno | 359/158 |
| 2003/0063837 A1 | * | 4/2003 | Gupta et al. | 385/15 |

OTHER PUBLICATIONS

S. Kawanishi, H. Takara, K. Uchiyama, I. Shake, and K. Mori, "3 Tbit/s (160 Gbit/s×19 channel) optical TDM and WDM transmission experiment," Electronic Letters, May 13, 1999, vol. 35, No. 19, pp. 826–827, 1999.

M. Nakazawa, T. Yamamoto, and K.R. Tamura, "1.28 Tbit/s–70 km OTDM transmission using third–and fourth–order simultaneous dispersion compensation with a phase modulator," Electronic Letters, Nov. 23, 2000, vol. 36, No. 24, pp. 2027–2029, 2000.

Th. Pfeiffer, and G. Veith, "40 GHz pulse generation using a widely tunable all polarisation preserving erbium fibre ring laser," Electronic Letters, Oct. 14, 1993, vol. 29, No. 21, pp. 1849–1850, 1993.

(Continued)

Primary Examiner—Brian M. Healy

(57) ABSTRACT

The present invention relating to a device and method for multiplication of repetition frequency in optical pulse trains. The device and the method multiply repetition frequency of optical pulse train generated with ML-FRL with high stability. The device comprises an optical fiber ring composed of optical fibers, an optical amplifier and a modulator for optically modulating, and an electric signal generator generating high frequency signals. The device generates an optical pulse train of repeating frequency of $f_m$, when applying electric signals of frequency of $f_m$ to the modulator. In addition to the construction, the stabilized optical pulse generator comprises a filter passing through frequencies of integer multiple of the applied modulation frequency $f_m$, and a composite cavity composed of a plurality of optical fibers of which lengths are different each other. As frequency $f_{c1}$ of the ring fiber of the long cavity of the composite cavity and a resonant frequency $f_{c2}$ of the ring fiber of the short cavity of the composite cavity, a lowest common multiple frequency $f'_{composite}$ of $f_{c1}$ and $f_{c2}$, which is integer multiple of $K \times f_m$, the stabilised optical pulse generator makes the repetition frequencies of the generated optical pulses of $P \times K \times f_m$ (K, P: integer).

19 Claims, 11 Drawing Sheets

OTHER PUBLICATIONS

K.K. Gupta, and D. Novak, "Millimetre–wave repetition–rate optical pulse train generation in harmonically mode-locked fibre ring laser," Electronic Letters, Jul. 17, 1997, vol. 33, pp. 1330–1331, 1997.

K.S. Abedin, M. Hyodo, and N. Onodera, "154 GHz polarization maintaining dispersion–managed actively mode-locked fibre ring laser," Electronic Letters, Jul. 6, 2002, vol. 36, No. 14, pp. 1185–1186, 2000.

Kamal K. Gupta, Noriaki Onodera, Kazi S. Abedin, and Masaharu Hyodo, "Pulse Repetition Frequency Multiplication Via Intracavity Optical Filtering in AM Mode–Locked Fibre Ring Lasers," IEEE Photinics Technology Letters, vol. 14, No. 3, pp. 284–286, Mar. 2002.

Z. Ahmed, and N. Onodera, "High–repetition rate optical pulse generation by frequency multiplication in actively mode–locked fibre ring lasers," Electronic Letters, Feb. 29, 1996, vol. 32, pp. 455–457, 1996.

M.Y. Jeon, H.K. Lee, J.T. Ahn, D.S. Lim, H.Y. Kim, K.H. Kim, and E.H. Lee, "External fibre laser based pulse amplitude equalisation scheme for rational harmonic modelocking in a ring–type fibre laser," Electronic Letters, Jan. 22, 1998, vol. 34, pp. 182–184, 1998.

K.K. Gupta, N. Onodera, and M. Hyodo, Technique to generate equal amplitude, higher–order optical pulses in rational harmonically modelocked fibre ring laser, Electronic Letters, Jul. 19, 2001, vol. 37, No. 15, pp. 948–950, 2001.

N. Onodera, "Supermode beat suppression in harmonically mode–locked erbium–doped fibre ring lasers with composite cavity structure," Electronic Letters, May 22, 1997, vol. 33, No. 11, pp. 962–963, 1997.

D.Von der Linde, "Characterization of noise in continuously operating mode–locked laser," Applied Physics. B, vol. 39, pp. 201–217, 1986.

Kamal K. Gupta et al., "High Repetition Rate Optical Plulse Generation in Fibre Ring Lasers Using Optical Filtering and Tailored Cavity Length", 7th Opto Electronics and Communications Conference Pacifico Yokohama Yokohama Kanagawa, Japan Jul. 8–12, 2002.

K.K. Gupta et al., "Novel Method To Increase Pulse Repetition Frequency in Fibre Ring Lasers", 28th European Conference on Optical Communication, Sep. 8–12, 2002 Bellaa Center Copenhagen Denmark.

* cited by examiner

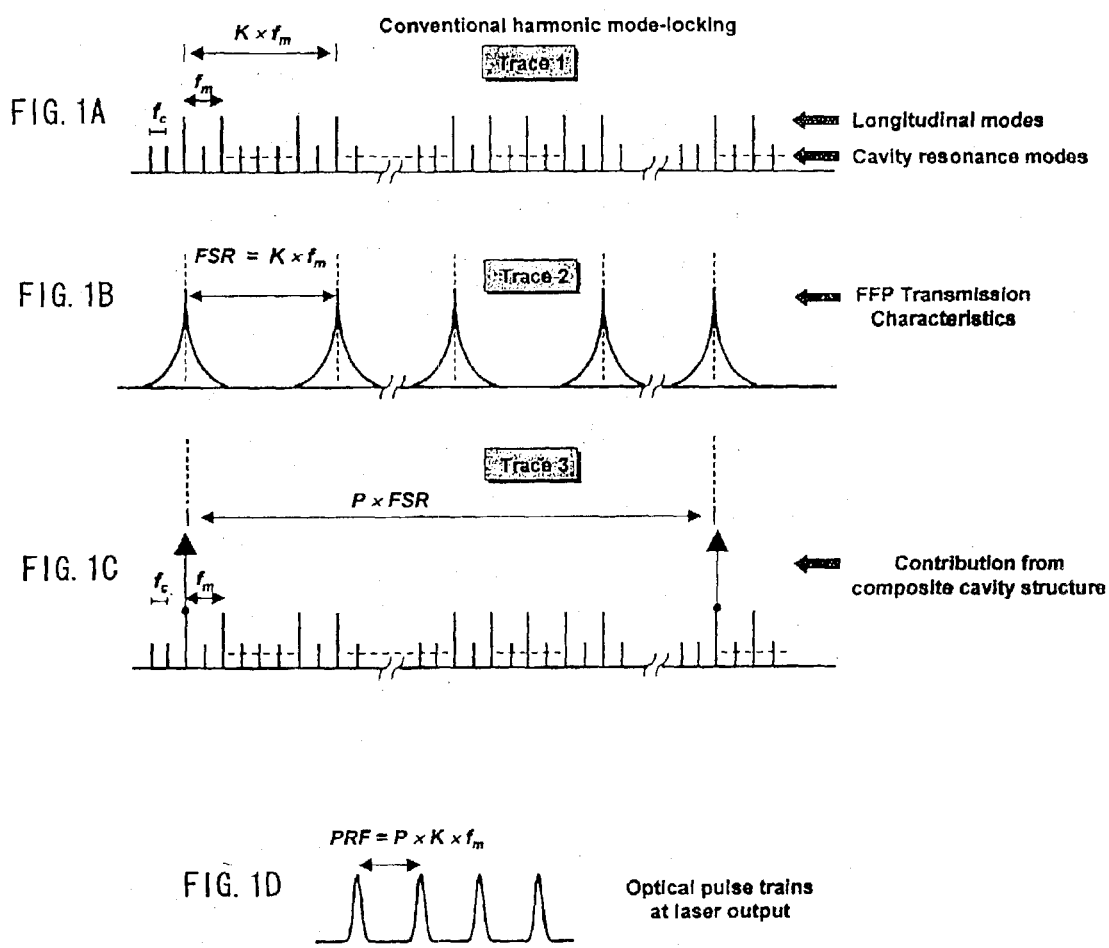

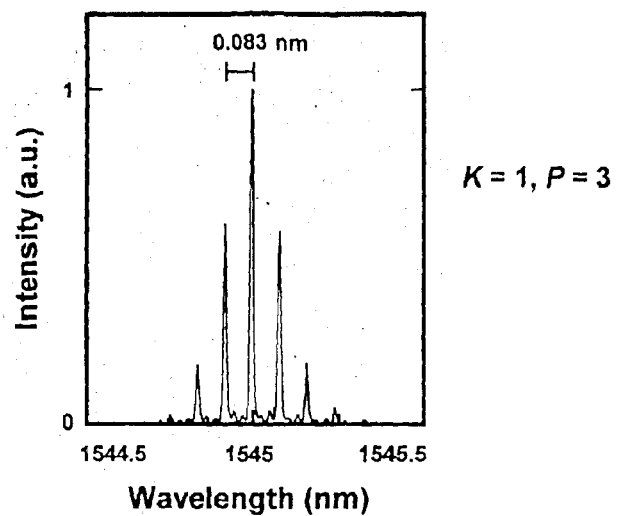
FIG. 5A      K = 1, P = 3
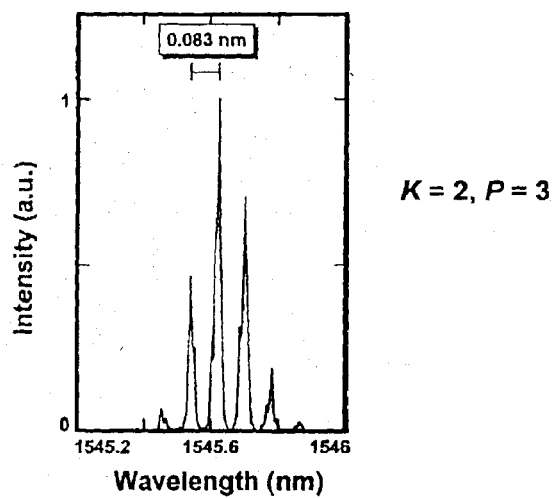
FIG. 5B      K = 2, P = 3
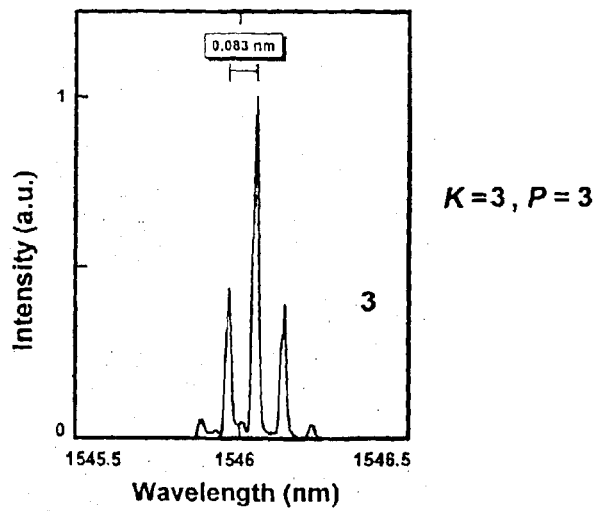
FIG. 5C      K = 3, P = 3

DEVICE AND METHOD FOR MULTIPLICATION OF REPETITION FREQUENCY IN OPTICAL PULSE TRAINS

CROSS REFERENCE TO RELATED APPLICATION

This application claims priority Japanese Patent Application No. 2002-70036, filed Mar. 14, 2002 in Japan, the contents of which are incorporated herein by reference.

BACKGROUND OF THE INVENTION

1. Field of the Invention

The present invention relates to a device and method for multiplication of repetition frequency in optical pulse trains. Especially the present invention provides the optical pulse generating device and method which multiplies repetition frequencies of the optical pulse trains generated within ML-FRL with high stability.

This invention is a scheme that can multiply pulse repetition frequency in active harmonically mode-locked fibre ring lasers and therefore making it as an optical pulse source for generating optical pulse trains at a repetition rates which is much higher than the applied modulation signal frequency. The high repetition optical pulse trains are important for the high-speed optical communication systems based on optical time-division multiplexing (OTDM) technology etc. Further, the present invention generates stable electrical signals at microwave frequency band, millimeter-wave frequency band, and higher frequency bands (>100 GHz).

2. Description of the Related Art

Short optical pulses at high repetition rates are important for future ultra high-speed optical communication systems (see references 1, 2). Active harmonically mode-locked fibre ring lasers (ML-FRL) have become very popular optical pulse source for OTDM/WDM based high-speed optical communication systems due to their ability to generate short and transform-limited optical pulses at high repetition rates. Here an RF modulation signal which is an harmonic of the cavity resonance frequency is applied to the RF port of the Mach-Zehnder intensity modulator (MZM) placed inside the cavity and biased at the quadrature point on its transmission characteristic curve, thereby generating optical pulses at a repetition frequency equal to the applied RF modulation signal frequency. However in such lasers, maximum pulse repetition frequency is limited by the modulator bandwidth as well as frequency of the drive electronics. In order to simplify the architecture of such high-speed communication systems, it is important that the base pulse rate is increased further. Several methods have been proposed to increase the pulse repetition frequency in ML-FRL while relaxing the requirement of large bandwidth MZM and RF drive electronics. These include frequency multiplication in intracavity Mach-Zehnder intensity modulator (MZM) where non-linear characteristic of the modulator was exploited to increase pulse repetition frequency (see references 3, 4), and intracavity optical filtering via fibre Fabry-Perot (FFP) filter where the concept of selective filtering of the oscillating longitudinal modes was successfully utilised to increase pulse repetition frequency in ML-FRL (see references 5, 6). In another method, modulation frequency was rationally detuned by $\pm f_c/p$ to generate optical pulse trains at a repetition rate of $p \times f_m$ in ML-FRL (see references 7–9).

FIG. 11(a) shows a prior art of the ML-FRL. In FIG. 11(a), an optical amplifier A comprises an excitation light source and a gain medium having optical amplifying characteristics, the gain medium 1 is comprised of Er/Yb doped fibres. A modulator 4 is composed of Mach-Zehnder modulator. An optical coupler 9 divides the light generated in the optical fibre ring to an optical sensor 23 by a rate of 10 to 90 (10% of whole generated light is passed to the optical sensor). An electric oscillator 21 generates high frequency electric signals. A measuring instrument 24 measures electric signals converted from the optical signals.

In the system of FIG. 11(a), the laser beam generated with the excitation light source 2 excites the Er/Yb doped fibres (EDF) that is a gain medium. As a result, optical signal oscillates in the fibre ring cavity at frequency which is a resonant frequency of the fibre ring cavity and the integer multiple of the resonant frequency, that is super harmonic mode. The electric signal generator 21 generates electric signals of frequency $f_m$, which is integer multiple of the cavity resonant frequency fc, and the frequency $f_m$ is applied to the modulator that is Mach-Zehnder optical intesity modulator 4. The modulator 4 is biased at voltage of $V_b$.

In the system of FIG. 11A, the repetition frequency of the optical pulse train generated in the fibre ring is equal to the applied modulation frequency $f_m$ when the modulator 4 is biased at its quadrature point on its transfer characteristics curve. FIG. 11B shows the pulse train generated by the above-mentioned system.

The concept of composite cavity structure was first proposed as a means to suppress supermode noise in ML-FRLs (see reference 10). As discussed earlier, one of the method of increasing pulse repetition frequency in ML-FRL is by using intracavity optical filtering in ML-FRL where a FFP filter with a free spectral range (FSR) equal to $K \times f_m$ was inserted in the ML-FRL cavity, where K is an integer, and $f_m$ is the applied modulation frequency. As a result, under cw operating condition, the laser cavity supports dominant cavity resonance modes which are frequency spaced at FSR. This in turn will lead to the generation of optical pulse trains at repetition rates equal to the FSR under harmonic mode-locking (see references 5, 6). In this method the maximum pulse repetition frequency is limited to the FSR of the intracavity FFP filter.

As mentioned above, the repetition frequency of the optical pulse train in the ML-FRL is limited to the integer multiple frequency of the frequency $f_m$, that is $K \times f_m$ (K: integer).

SUMMARY OF THE INVENTION

The object of the present invention is to provide a new device and method for multiplication of repetition frequency in optical pulse trains. The device and the method multiply respectively the repetition frequency of optical pulse trains generated with the ML-FRL with high stability.

The device and method for multiplication of repetition frequency in optical pulse trains increase pulse repetition frequency in ML-FRLs which are based on intracavity optical filtering and tailored laser cavity length via a composite cavity structure are proposed in the present invention, The present invention involves an intra-cavity optical filtering using a fibre Fabry-Perot (FFP) filter with free spectral range (FSR) which is equal to an harmonic multiple of the applied modulation frequency (FSR=$K \times f_m$), where K is an integer, and cavity length tailoring via composite cavity structure. The present invention increases pulse repetition frequency in active harmonically mode-locked fibre ring lasers (ML-FRL) via appropriate selection of the main longitudinal modes, combined with selective filtering of the undesired randomly oscillating intermediate modes as well as cavity resonance modes realised by the FFP filter.

BRIEF DESCRIPTION OF DRAWINGS

FIG. 1A shows frequency spectra of optical pulses generated in the ML-FRL cavity.

FIG. 1B shows a characteristic of FFP filter.

FIG. 1C shows spectra in the case where a composite cavity structure is incorporated in the fibre ring cavity with the FFP filter.

FIG. 1D shows a pulse train of repetition frequency $PRF=P \times K \times f_m$ which is output from the fibre ring laser incorporating the present invention.

FIG. 5A shows optical spectra of output pulse trains generated with the present invention at K=1, P=3.

FIG. 5B shows optical spectra of output pulse trains generated with the present invention at K=2, P=3.

FIG. 5C shows optical spectra of output pulse trains generated with the present invention at K=3, P=3.

DETAILED DESCRIPTION OF THE PREFERRED EMBODIMENTS

Figures 2A, 2B:
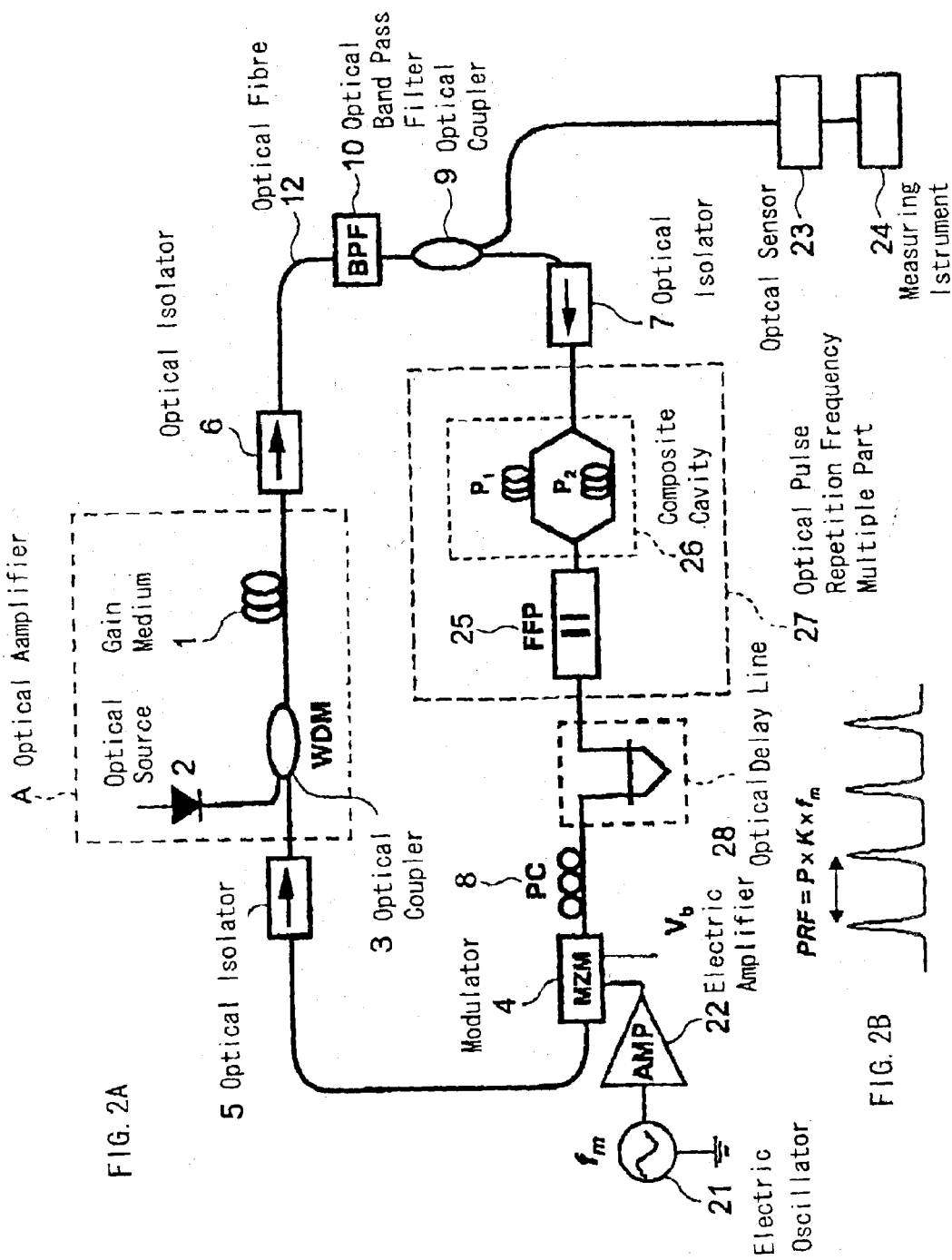
FIG. 2A shows a system of the first embodiment of the present invention.
FIG. 2B shows an optical pulse train generated in the ML-FRL with the first embodiment.

A more detailed explanation of the principle of the present invention is as follows. To further increase the pulse repetition frequency which is higher than the FSR of FFP filter, it is important to enhance the oscillations of higher order cavity resonance modes with frequency spacing greater than the FSR. In order to accomplish this new method of pulse repetition frequency multiplication based on intracavity optical filtering and composite cavity structure is proposed. Here the cavity length was tailored via composite cavity structure which consists of a pair of 50/50 optical couplers, and a pair of fibre patch cords $P_1$ and $P_2$ with lengths $L_1$ and $L_2$, respectively. The lengths $L_1$ and $L_2$ (where $L_1 > L_2$) are chosen in such a way that the cavity resonance frequencies $f_{c1}$ and $f_{c2}$ of long cavity and short cavity, respectively interact constructively at their lowest common multiple frequency which is equal to an harmonic multiple of the FSR. As a result, the composite cavity ML-FRL incorporating intracavity FFP filter supports dominant cavity resonance modes that are separated by a frequency spacing of $P \times FSR$ or $P \times K \times f_m$. This indicates that the composite cavity ML-FRL has a virtual cavity resonance frequency $f_{composite}$ such that $f_{composite}=P \times K \times f_m$. Under active harmonic mode-locking operation, when a modulation frequency $f_m$ is applied to the intracavity MZM, the dominant and phase matched longitudinal modes are frequency spaced at $P \times FSR$. Under steady state condition this results in the generation of optical pulses with a repetition frequency of $P \times FSR$. It means pulse repetition frequency is increased to $P \times K \times f_m$ in a composite cavity ML-FRL as compared to that of $f_m$ in a conventional ML-FRL. The main advantage of intracavity FFP filter is that the dominant longitudinal modes with frequency spacing at $P \times FSR$ are allowed to pass through every $P^{th}$ transmission peaks of the filter while blocking the other low intensity, randomly oscillating cavity modes and intermediate longitudinal modes, thereby increasing the stability of generated optical pulse trains.

FIGS. 1A, B, C and D present a qualitative description of the mechanism of pulse repetition frequency multiplication in composite cavity ML-FRL incorporating intracavity optical filtering.

FIG. 1A shows frequency spectra of optical pulses generated in the conventional ML-FRL. This figure shows that the main longitudinal modes are separated by the applied modulation frequency $f_m$ which is an harmonic of the fundamental cavity resonance frequency $f_c$. FIG. 1B shows the transmission characteristics of FFP filter. Signals of frequency $FSR=K \times f_m$ passes through the filter while the signals at other frequencies are blocked. FIG. 1C shows spectra in the case where a composite cavity structure is incorporated in the fibre ring cavity with the FFP filter. In this figure, the oscillations of the main longitudinal modes which are separated by $P \times FSR$ are enhanced due to the composite cavity structure with in the fibre ring cavity. While the intermediary longitudinal modes as well as cavity resonance modes are suppressed. Under the steady state conditions, the dominant modes separated by $P \times FSR$ are phase matched which results in the generation of optical pulses with a repetition frequency of $P \times K \times f_m$. FIG. 1D shows a pulse train of repetition frequency $PRF=P \times K \times f_m$, which is output from the fibre ring laser incorporating the present invention.

As described earlier, in conventional harmonically mode-locked fibre ring laser generating optical pulses with repetition frequency equal to the applied modulation frequency $f_m$. In this case the laser cavity supports main longitudinal modes which are phase matched and frequency spaced at $f_m$, and randomly oscillating cavity resonance modes at $f_c$. When a Fabry-Perot filter with $FSR=K \times f_m$ is inserted in the ML-FRL cavity, the main longitudinal modes which are separated by $K \times f_m$ coincide with the transmission peaks of the FFP filter and therefore passed through the filter while the intermediate longitudinal modes as well as resonance cavity modes are blocked resulting in the generation of optical pulse trains with repetition frequency equal to $K \times f_m$ as shown schematically in traces 1 and 2. As explained earlier, with the inclusion of composite cavity structure, it is possible to increase the oscillations of higher order longitudinal modes which are separated by much higher frequency of P×FSR, where P is an integer and is shown by an arrow in trace 3. These dominant higher order longitudinal modes which coincide with the $P^{th}$ transmission peaks of the FFP filter are allowed to pass through the filter while the other low intensity intermediate longitudinal modes are blocked. This results in the generation of optical pulse trains with repetition rates of P×FSR or $P \times K \times f_m$, thereby increasing pulse repetition frequency by a factor of P×K as compared the conventional ML-FRL and is shown in FIG. 1(d).

Figures 11A, 11B:
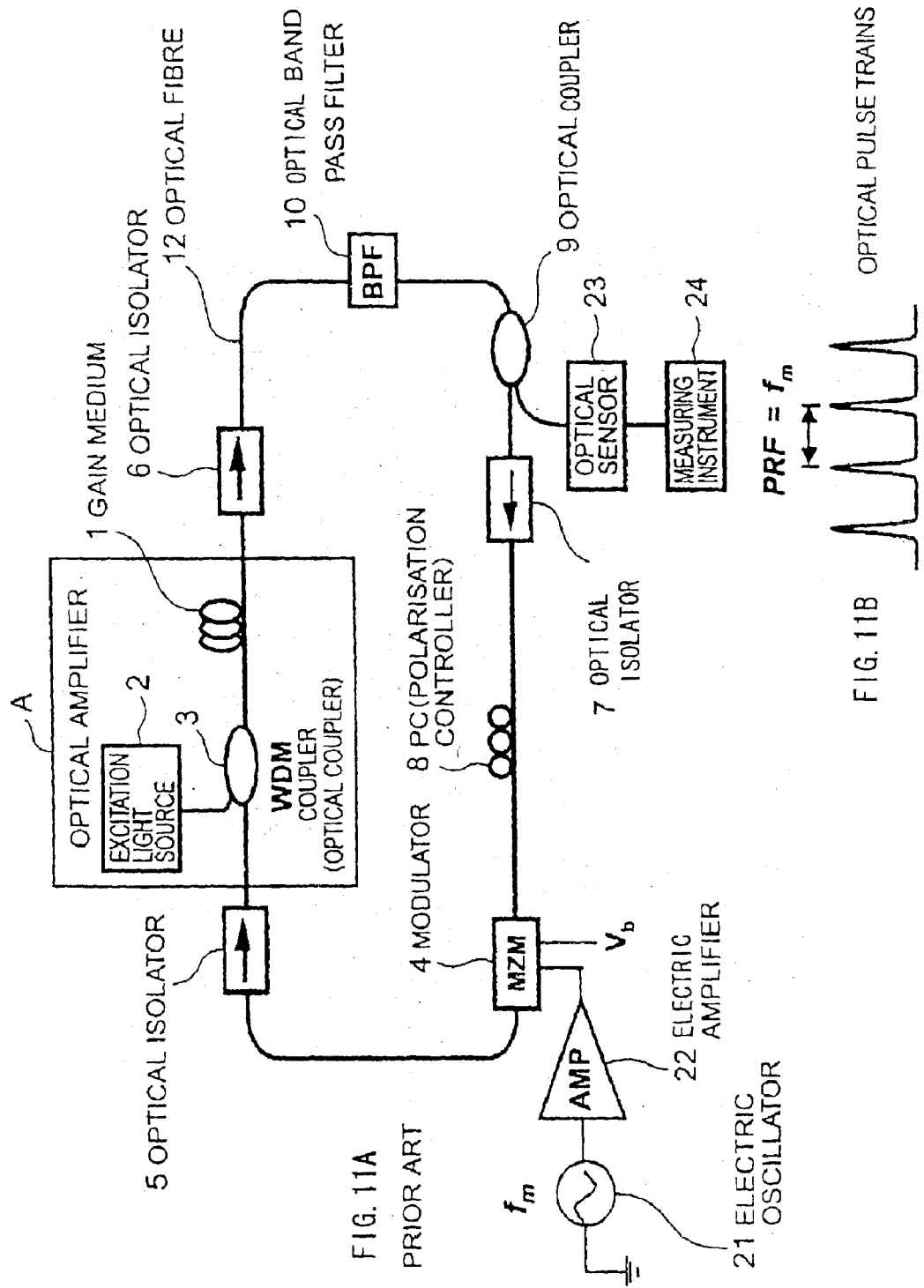
FIG. 11A shows a prior art of ML-FRL.
FIG. 11B shows an optical train generated in the ML-FRL of the prior art.

The experimental setup of active harmonically mode-locked fibre ring laser incorporating optical filtering and composite cavity structure is shown in FIG. 2A which is a first embodiment of the present invention. In FIG. 2A, same reference numbers with in FIG. 11 denote same part. The optical amplifier A is composed of optical fibres having optical amplifying characteristics and an exciting light source. In FIG. 2A, the gain medium 1 is composed of fibres doped rare earth element such as Erbium (Er), Thulium (Tm), Neodymium (Nd), Praseodymium (Pr) etc. that causes the optical amplifying characteristics. Fluoride series can be used also as the doped element. An optical pulse repetition frequency multiplier 27 is composed of a FFP filter 25 and a composite cavity 26. The optical fibres 12 and the fibres of the composite cavity 26 are composed of single mode fibres. FIG. 2B shows an optical pulse train generated in the ML-FRL of the second embodiment.

The laser consists of Er/Yb co-doped fibre as a gain medium which was pumped by a 1064 nm laser via a WDM. A FFP with FSR of 3.48 GHz (more precisely 3.478 GHz), a 10 GHz Mach-Zehnder intensity modulator, and an optical bandpass filter with a 3-dB bandwidth of 2.5 nm were inserted within the laser cavity. An optical delay line was used in the cavity for minor adjustment of the cavity length. The laser output was obtained by a 10% output coupler. The composite cavity structure was constructed with two 50/50 optical couplers, and a pair of fibre patch cords $P_1$ and $P_2$ with lengths 201.968 cm and 200 cm, respectively. This results in the formation of two cavities one with a longer cavity length $L_1=6010.1391$ cm and a shorter cavity length $L_2=6008.1711$ cm. The resonance frequency of the respective cavities are $$f'_{c1} = 3.4188 \text{ MHz, and } f'_{c2} = 3.42 \text{ MHz,}$$

and their lowest common multiple frequency is 10.441 GHz which is also a $3054^{th}$, and $3053^{rd}$ harmonic of $$f'_{c1}, \text{ and } f'_{c2},$$

respectively. This leads to a frequency separation of 10.44 GHz between dominant cavity modes in composite cavity ML-FRL which reflects that the resonance frequency of composite cavity ML-FRL $$f'_{composite}$$

is 10.44 GHz.

Figure 3:
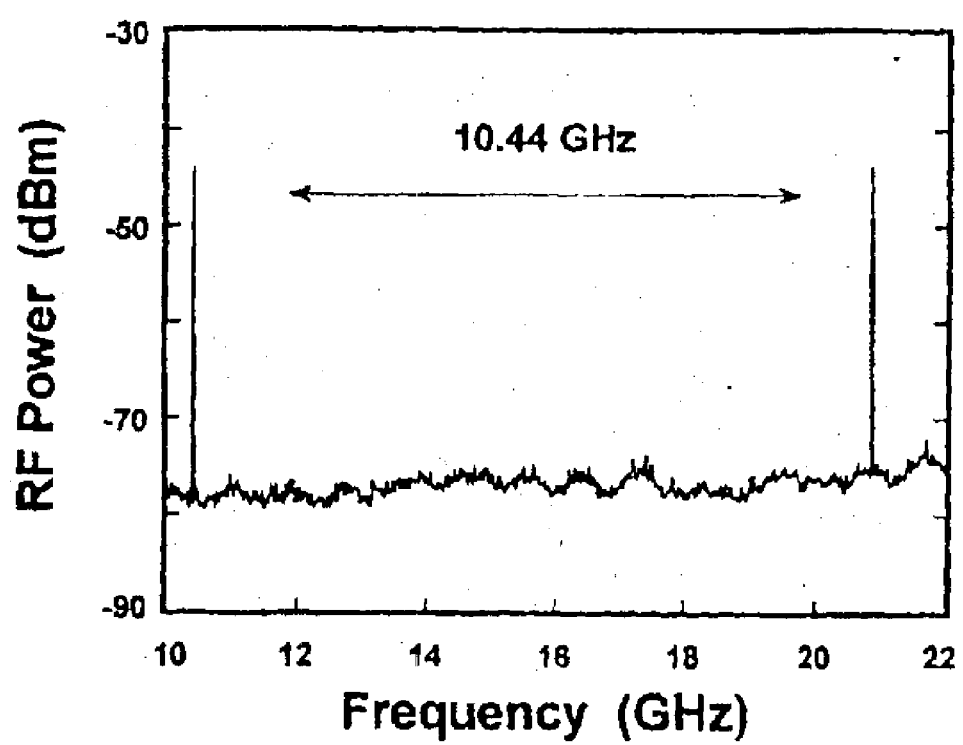
FIG. 3 shows RF spectrum of the present invention under cw operation.

FIG. 3 shows the harmonics of 10.44 GHz in the detected RF spectrum of the output observed under cw operation of composite cavity ML-FRL incorporating intracavity optical filtering. The frequency separation of 10.44 GHz is evident from FIG. 3

Figure 4A:
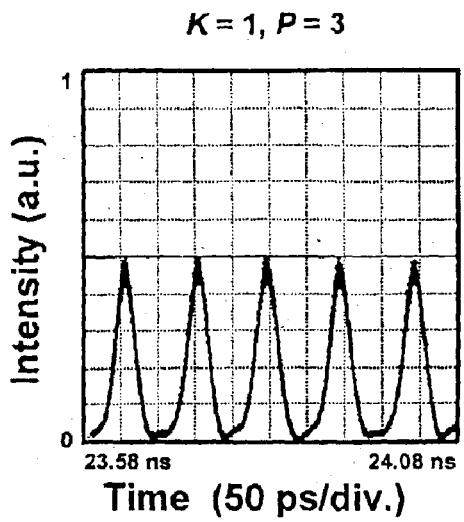
FIG. 4A shows an oscilloscope trace of higher order optical pulse trains at K=1, P=3.
Figure 4B:
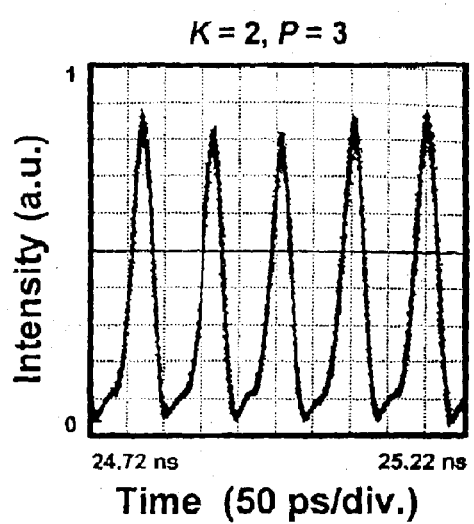
FIG. 4B shows an oscilloscope trace of higher order optical pulse trains at K=2, P=3.
Figure 4C:
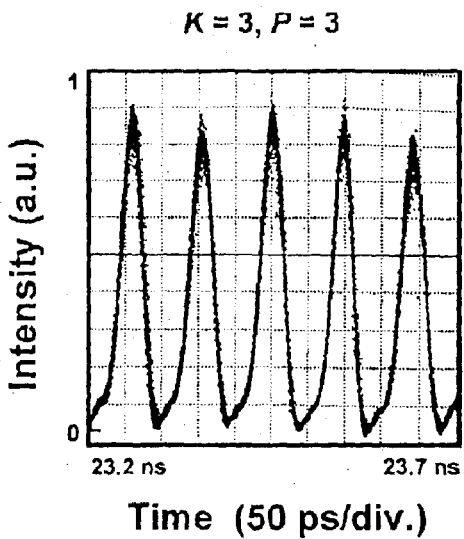
FIG. 4C shows an oscilloscope trace of higher order optical pulse trains at K=3, P=3.

First a +29 dBm modulation signal of 3.477545 GHz which is approximately equal to the 3.48 GHz, the FSR of the FFP filter (for K=1) and a $3^{rd}$ subharmonic of the composite cavity resonance frequency of 10.44 GHz (for P=3), was applied to the MZM which was biased at the quadrature point on its transfer characteristic curve. The cavity length was finely adjusted via optical delay line and thereby successfully generated optical pulses with a repetition frequency of 10.433 GHz which is 3-times (K=1, P=3) of the applied modulation frequency. The generated optical pulse trains was observed on a Tektronix CSA sampling oscilloscope with sampling head SD-26 (17.4 ps rise time) and is shown in FIG. 4A. It is evident from the figure that under persistence mode, the 10.433 GHz pulses are equal in amplitudes and exhibit high stability in terms of extremely low amplitude noise and timing jitter. In order to achieve higher repetition frequency multiplication factor P×K>3, applied modulation frequency was decreased subharmonically with respect to FSR of the filter while keeping the value of FSR and $$f'_{composite}$$

constant. We applied modulation signal of $f_m=1.7385$ GHz (for K=2, P=3) and $f_m=1.159$ GHz (for K=3, P=3) while biasing the MZM at quadrature point on its transfer characteristic curve and successfully generated optical pulses with a constant repetition frequency of 10.433 GHz as shown in FIGS. 4B and C, respectively. It is clear from the figure that under persistence mode, generated pulses were very stable with low amplitude noise and timing jitter. Thus establishing pulse repetition frequency multiplication to 6-times and 9-times to that of the pulses which were obtained from the conventional ML-FRL.

Further, optical spectrum of the 10.433 GHz pulse trains obtained under pulse repetition frequency multiplication realised by using intracavity optical filtering, and composite cavity structure in ML-FRL was investigated. The optical spectrum of the pulse train was measured via a high-resolution optical spectrum analyser (resolution bandwidth of 0.01 nm). FIGS. 5A, B and C show the optical spectra of 10.433 GHz pulse trains obtained via $3^{rd}$-order, $6^{th}$-order, and $9^{th}$-order pulse multiplication using a modulation signal of 3.477545 GHz, 1.7385 GHz, and 1.159 GHz, respectively. From the FIGS. 5A, B and C, it is evident that the longitudinal modes were separated by 0.083 nm which approximately corresponds to a pulse repetition frequency of 10.433 GHz. The measured FWHM spectral widths of $3^{rd}$-order, $6^{th}$-order, and $9^{th}$-order pulse trains were 0.197 nm, 0.161 nm, and 0.143 nm, respectively.

Figure 6A:
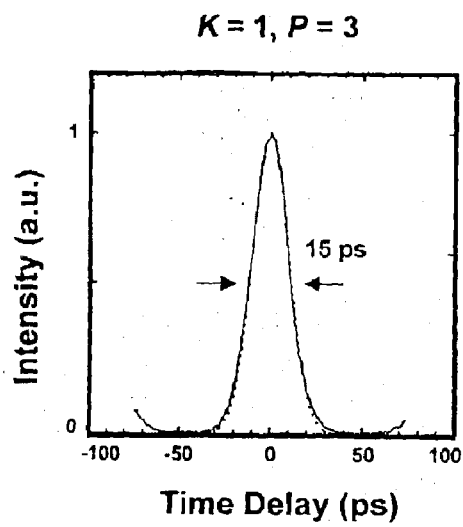
FIG. 6A shows an auto-correlation of corresponding optical pulse trains with the present invention at K=1, P=3.
Figure 6B:
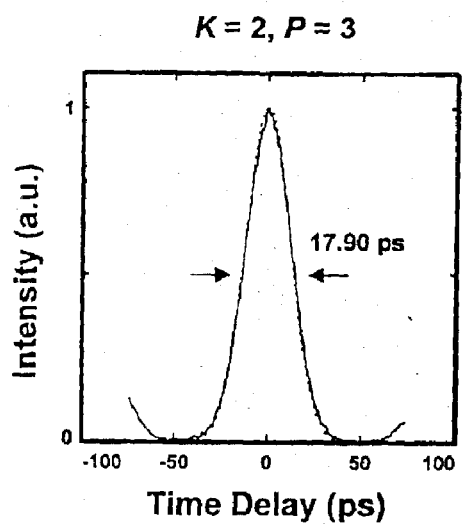
FIG. 6B shows an auto-correlation of corresponding optical pulse trains at K=2, P=3.
Figure 6C:
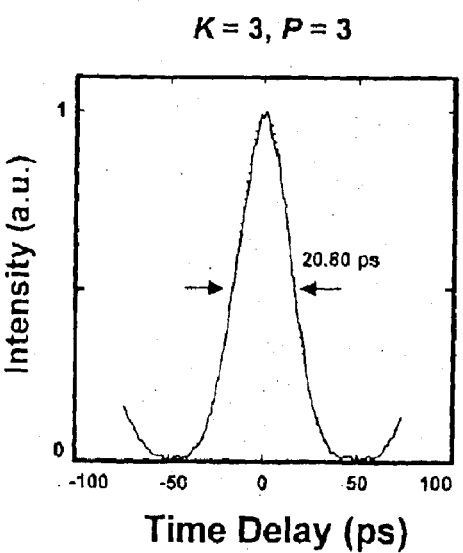
FIG. 6C shows an auto-correlation of corresponding optical pulse trains at K=3, P=3.

FIG. 6, shows that the pulses measured via SHG autocorrelator resemble with $Sech^2$ profile with FWHM pulse width of 15 ps, 17.90 ps, and 20.80 ps for the $3^{rd}$-order, $6^{th}$-order, and $9^{th}$-order optical pulse trains, respectively. This gives the respective time-bandwidth products of 0.37, 0.36, and 0.37, indicating that the pulses were close to transform-limited.

Figure 7A:
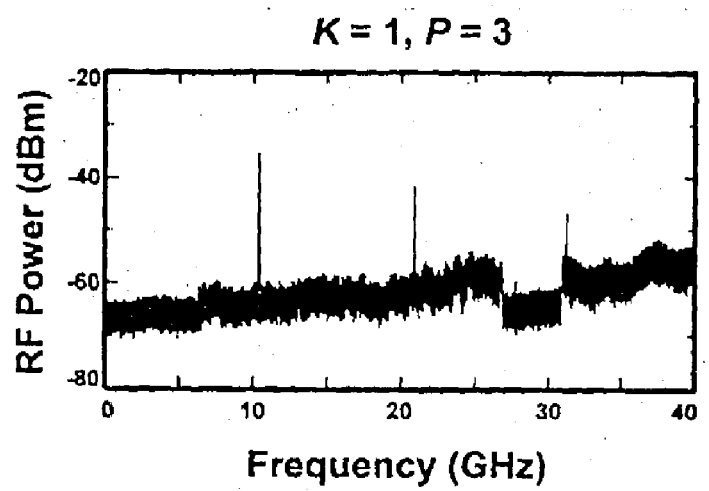
FIG. 7A shows measured RF spectra obtained from the ML-FRL with the present invention at K=1, P=3.
Figure 7B:
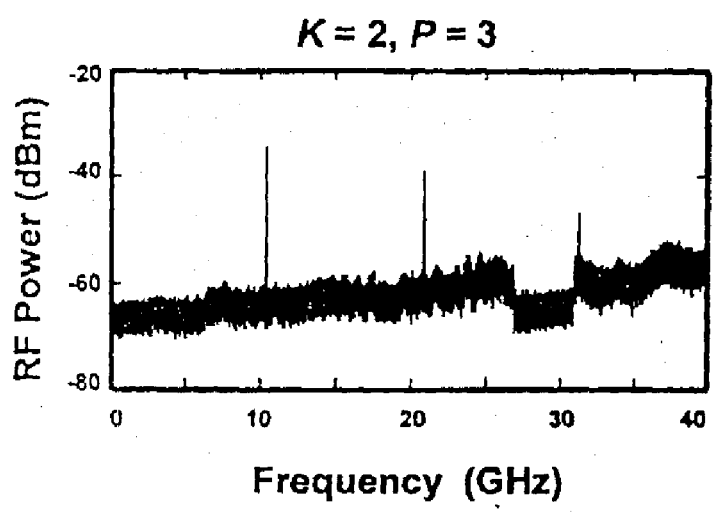
FIG. 7B shows measured RF spectra obtained from the ML-FRL with the present invention at K=2, P=3.
Figure 7C:
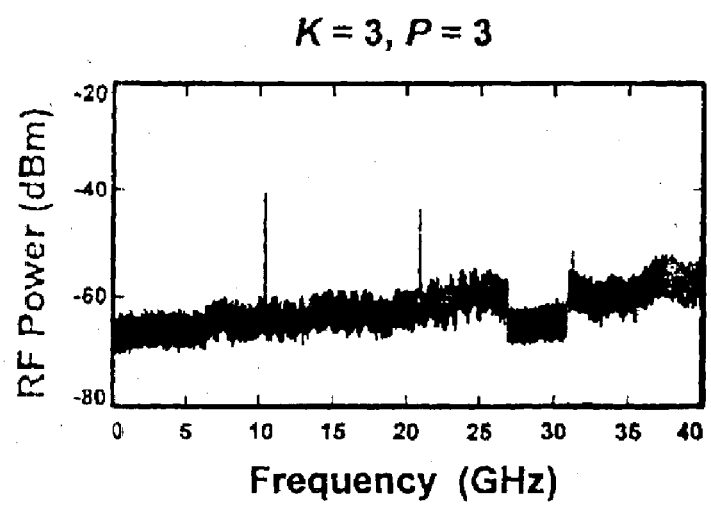
FIG. 7C shows measured RF spectra obtained from the ML-FRL with the present invention at K=3, P=3.
Figure 8A:
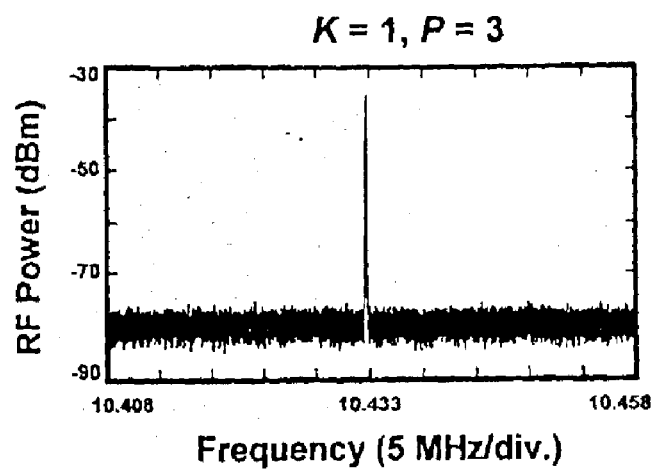
FIG. 8A shows close-in-view of the measured RF spectra obtained from the ML-FRL with the present invention at K=1, P=3.
Figure 8B:
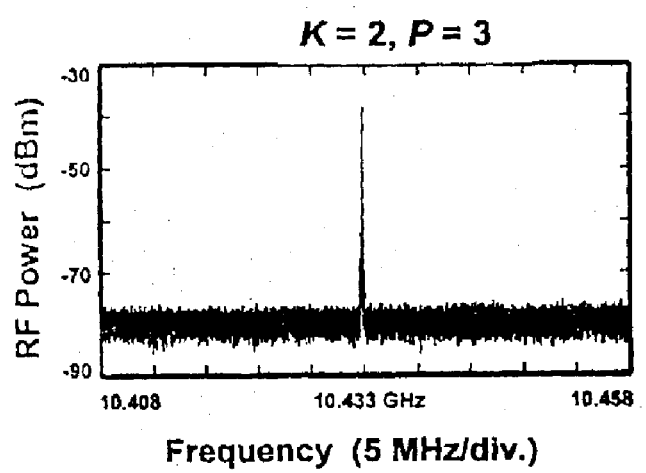
FIG. 8B shows close-in-view of the measured RF spectra obtained from the ML-FRL with the present invention at K=2, P=3.
Figure 8C:
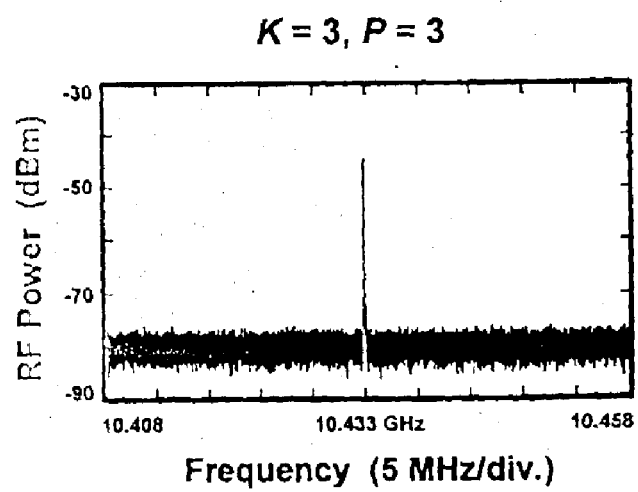
FIG. 8C shows close-in-view of the measured RF spectra obtained from the ML-FRL with the present invention at K=3, P=3.

FIGS. 7A, B and C show measured RF spectra generated with the present invention. The higher order optical pulse trains from the composite cavity ML-FRL were detected by using a high-speed 45 GHz photodetector in conjunction with a millimeter-wave spectrum analyser as shown in FIGS. 7A, B and C and the detected RF spectra were then evaluated in all the three cases. It can be seen from the figure that harmonics of the applied modulation frequency at $f_m$, $2f_m$, etc. were suppressed by more than 27 dB, 26 dB, and 23 dB, in $3^{rd}$-order, $6^{th}$-order, and $9^{th}$-order pulse trains, respectively. The close-in view of the RF spectra was observed at 10.433 GHz under a much higher resolution bandwidth as shown in FIGS. 8(a), (b) and (c). It is evident from the figure that supermode noise was suppressed by more than 40 dB in $3^{rd}$-order, 38 dB in $6^{th}$-order, and 32 dB in $9^{th}$-order optical pulse trains, respectively. These measurements data shows that the new method of pulse repetition frequency multiplication was successfully implemented.

Figure 9A:
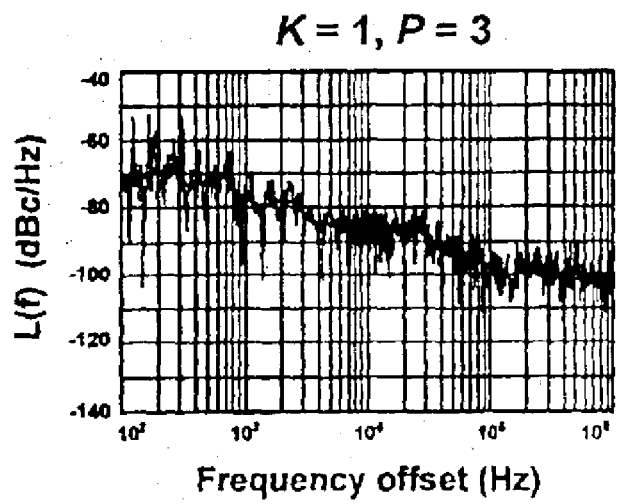
FIG. 9A shows measured single side-band spectral noise density distribution of optical pulse trains generated at K=1, P=3 with the present invention.
Figure 9B:
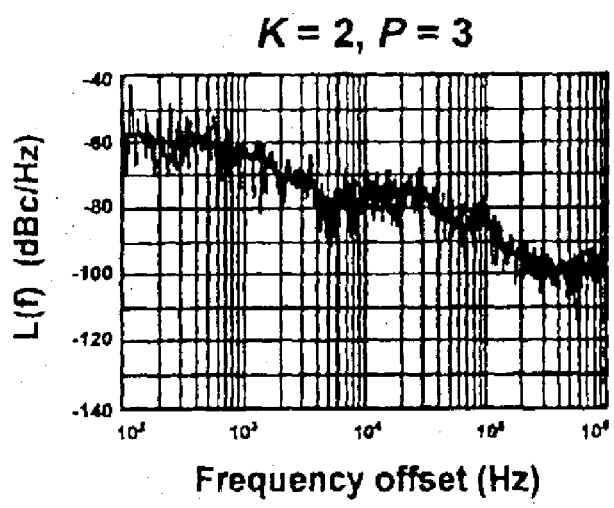
FIG. 9B shows measured single side-band spectral noise density distribution of optical pulse trains generated at K=2, P=3 with the present invention.
Figure 9C:
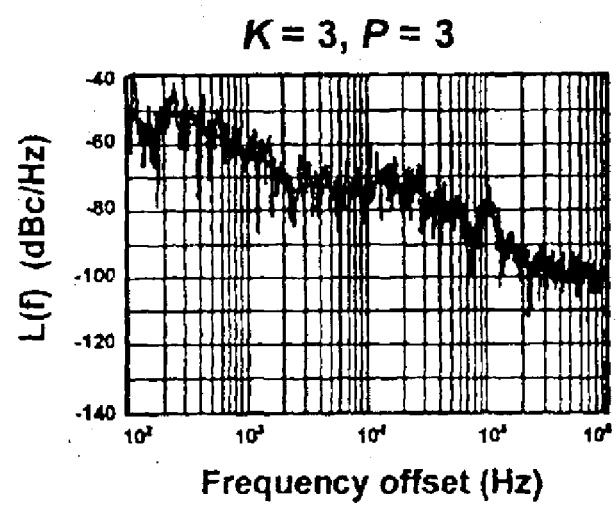
FIG. 9C shows measured single side-band spectral noise density distribution of optical pulse trains generated at K=3, P=3 with the present invention.

The spectral purity in terms of amplitude noise and phase noise or timing jitter in 10.433 GHz optical pulse trains was further investigated using spectral domain technique (see reference 11). It was observed that in the measured single sideband noise spectral power density distribution L(f), $3^{rd}$-order optical pulse trains exhibit a phase noise of −88.17 dBc/Hz, and −98.43 dBc/Hz at 10 kHz and 100 kHz offset frequencies from the 10.433 GHz carrier while in $6^{th}$-order pulse trains, the phase noise were −78.33 dBc/Hz, −84.95 dBc/Hz, and for $9^{th}$-order pulse trains, the phase noise were −73.67 dBc/Hz, −81.01 dBc/Hz at 10 kHz, and 100 kHz offset frequencies, respectively. FIG. 9 shows the L(f) distribution of $3^{rd}$-order, and $6^{th}$-order, and $9^{th}$-order pulse trains measured at the fundamental frequency component of 10.433 GHz. Further, the total pulse noise which includes both amplitude noise and phase noise was measured from the integrated L(f) distribution over a large offset frequency range of 100 Hz–1 MHz from the 10.433 GHz carrier. From the measured total pulse noise data, a low amplitude noise of 0.17% and 0.8%, 1.25% and a timing jitter of 0.34 ps, 1.0 ps, and 1.5 ps were estimated respectively, for the $3^{rd}$-order, and $6^{th}$-order, and $9^{th}$-order pulse trains. Typically, the timing jitter is calculated from the measured phase noise at large harmonic numbers where phase noise is dominant (see reference 11), however higher number of harmonics of 10.433 GHz repetition frequency could not be detected due to the limited bandwidth of the detecting instruments. The low amplitude noise, phase noise, and timing jitter confirm the excellent spectral purity of the $3^{rd}$-order, and $6^{th}$-order, and $9^{th}$-order optical pulse trains with repetition frequency of 10.433 GHz generated by the new pulse repetition frequency multiplication method implemented via optical filtering and composite cavity structure in active harmonically mode-locked fibre ring lasers.

Figures 10A, 10B:
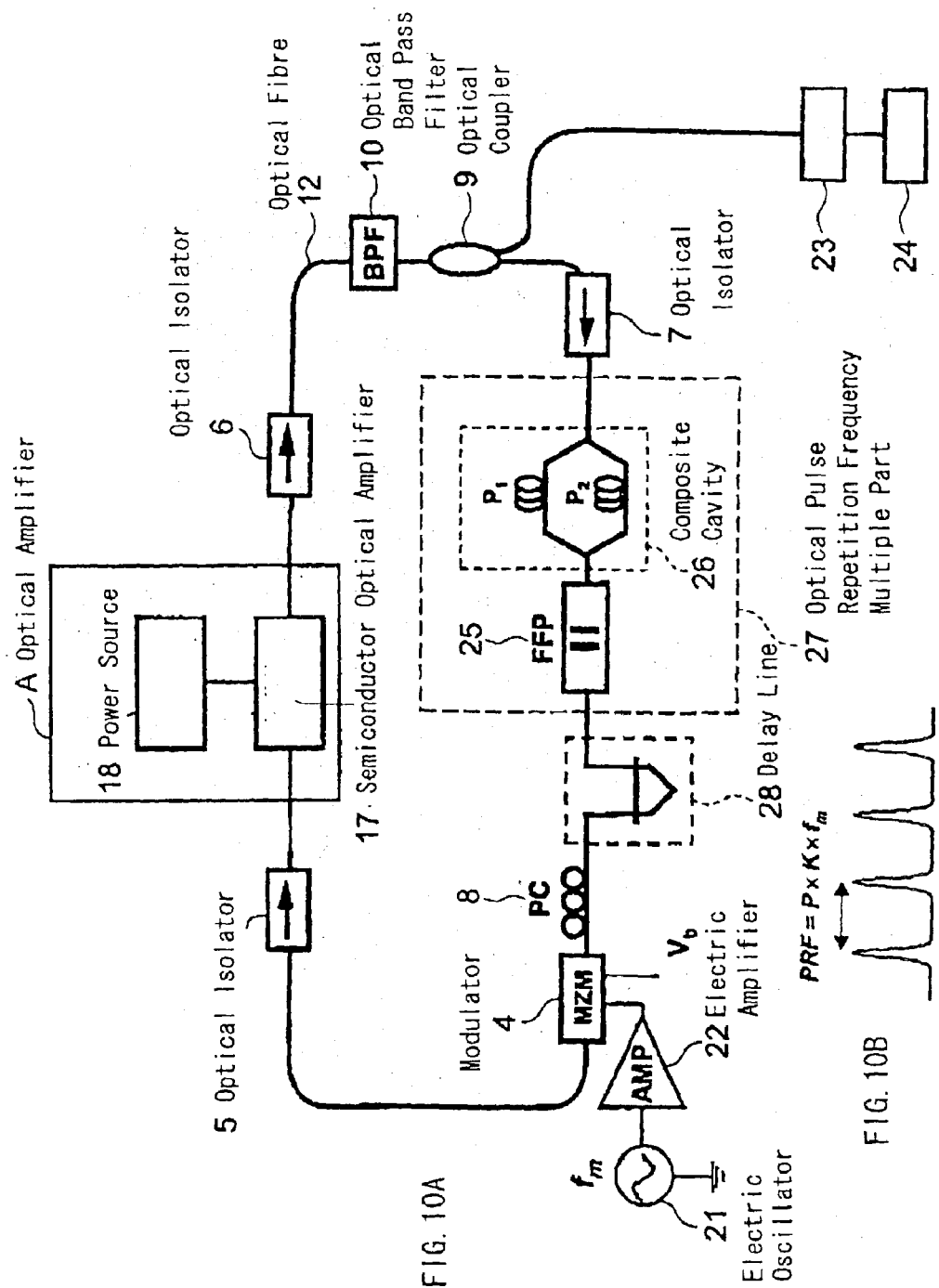
FIG. 10A shows a system of the second embodiment of the present invention.
FIG. 10B shows an optical train generated in the ML-FRL of the second embodiment.

FIG. 10A shows a system of the second embodiment of the present invention. FIG. 10B shows an optical train generated in the ML-FRL of the second embodiment. The system of the second embodiment uses a semiconductor optical amplifier as the optical amplifier. In FIG. 10A, same references with in FIG. 2A show same part. The optical amplifier A is composed of a power source 18 and a semiconductor optical amplifier 17. The system of FIG. 10A is different from system of FIG. 2A only in the semiconductor optical amplifier 17 which radiates laser beam and amplifies the beam.

The present invention causes excellent effects as follows. The higher order pulse repetition frequency multiplication in active harmonically mode-locked fibre ring lasers achieved via the present invention. In the present invention, a fibre Fabry-Perot filter was inserted within the ring cavity in conjunction with a composite cavity structure that is made of two optical fibres with slightly different lengths. The generated optical pulses are highly stable with a high degree of spectral purity. The present invention therefore has many advantages such as (i) generation of optical pulses at a much higher repetition frequency using a much lower frequency drive electronics which comprises electric oscillator 21, electric amplifier 22, and Mach-Zehnder intensity modulator 4, in FIG. 2(a), (ii) significant reduction in the cost of the high-speed optical communication systems, and (iii) simplifying the architecture of the optical communication systems which need highly stable optical pulse trains at high repetition frequency.

References

1. S. Kawanishi, H. Takara, K. Uchiyama, I. Shake, and K. Mori, "3 Tbit/s (160 Gbit/s×19 channel) optical TDM and WDM transmission experiment," *Electronic Letters*, vol. 35, no. 10, pp. 826–827, 1999.
2. M. Nakazawa, T. Yamamoto, and K. R. Tamura, "1.28 Tbit/s-70 km OTDM transmission using third- and fourth-order simultaneous dispersion compensation with a phase modulator," *Electronic Letters*, vol. 36, no. 24, pp. 2027–2029, 2000.
3. Th. Pfeiffer, and G. Veith, "40 GHz pulse generation using a widely tunable all polarisation preserving erbium fibre ring laser," *Electronic Letters*, vol. 29, no. 21, pp. 1849–1850, 1993.
4. K. K. Gupta, and D. Novak, "Millimeter-wave repetition-rate optical pulse train generation in harmonically modelocked fibre ring laser," *Electronic Letters*, vol. 33, pp. 1330–1331, 1997.
5. K. S. Abedin, M. Hyodo, and N. Onodera, "154 GHz polarization maintaining dispersion-managed actively modelocked fibre ring laser," *Electronic Letters*, vol. 36, no. 14, pp. 1185–1186, 2000.
6. Kamal K. Gupta, Noriaki Onodera, Kazi S. Abedin, and Masaharu Hyodo, "Pulse repetition frequency multiplication via intra-cavity optical filtering in AM mode-locked fibre ring lasers," *IEEE Photinics Technology Letters*, vol. 14, no.3, pp. 284–286, March 2002.
7. Z. Ahmed, and N. Onodera, "High-repetition rate optical pulse generation by frequency multiplication in actively mode-locked fibre ring lasers," *Electronic Letters*, vol. 32, pp. 455–457, 1996.
8. M. Y. Jeon, H. K. Lee, J. T. Ahn, D. S. Lim, H. Y. Kim, K. H. Kim, and E. H. Lee, "External fibre laser based pulse amplitude equalisation scheme for rational harmonic modelocking in a ring-type fibre laser," *Electronic Letters*, vol 34, pp. 182–184, 1998.
9. K. K. Gupta, N. Onodera, and M. Hyodo, "Technique to generate equal amplitude, higher-order optical pulses in rational harmonically modelocked fibre ring laser," *Electronic Letters*, vol. 37, no. 15, pp. 948–950, 2001.
10. N. Onodera, "Supermode beat suppression in harmonically mode-locked erbium-doped fibre ring lasers with composite cavity structure," *Electronic Letters*, vol. 33, no. 11, pp. 962–963, 1997.

11. D. Von der Linde, "Characterisation of noise in continuously operating mode-locked laser," *Applied Physics. B*, vol 39, pp. 201–217, 1986.

What is claimed is:

1. A device for multiplication of repetition frequency in optical pulse trains composed of optical fibres, an optical amplifier and a modulator for optical modulation, and an electric signal generator generating high frequency signals, comprising:

wherein, the modulator makes an optical pulse train of repeating frequency of $f_m$, when applying electric signals of frequency of $f_m$ to the modulator; and a filter which can pass integer multiple frequencies of the applied modulation frequency $f_m$, and a composite cavity composed of a plurality of optical fibres of which lengths are different from each other; wherein as a resonant frequency $f_{c1}$ of the fibre ring of the long cavity of the composite cavity and a resonant frequency $f_{c2}$ of the fibre ring of the short cavity of the composite cavity, a lowest common multiple frequency $$f'_{composite}$$

of $f_{c1}$ and $f_{c2}$, and as frequency $K \times f_m$ (K:integer) which passes through the filter, the frequency $$f'_{composite}$$

is integer multiple of $K \times f_m$, and the repetition frequencies of the generated optical pulses are $P \times K \times f_m$ (P: integer.).

2. A device for multiplication of repetition frequency in optical pulse trains in claim 1, wherein the filter is a Fabry-Perot filter.

3. A device for multiplication of repetition frequency in optical pulse trains in claim 1, wherein the modulator is a Mach-Zehnder intensity modulator which is biased at a voltage which is at the quadrature point on its transfer characteristic curve to generate sidebands of the modulation frequency.

4. A device for multiplication of repetition frequency in optical pulse trains in claim 1, wherein the optical amplifier is composed of an optical fibre having optical amplifying characteristics, and an excitation optical signal source.

5. A device for multiplication of repetition frequency in optical pulse trains in claim 2, wherein the optical amplifier is composed of an optical fibre having optical amplifying characteristics, and an excitation optical signal source.

6. A device for multiplication of repetition frequency in optical pulse trains in claim 3, wherein the optical amplifier is composed of an optical fibre having optical amplifying characteristics, and an excitation optical signal source.

7. A device for multiplication of repetition frequency in optical pulse trains in claim 4, wherein the optical fibre is glass fibres doped with rare earth erbium-ions/ytterbium-ions (Er/Yb-ions).

8. A device for multiplication of repetition frequency in optical pulse trains in claim 5, wherein the optical fibre is glass fibres doped with rare earth erbium-ions/ytterbium-ions (Er/Yb-ions).

9. A device for multiplication of repetition frequency in optical pulse trains in claim 6, wherein the optical fibre is glass fibre doped with rare earth erbium-ions/ytterbium-ions (Er/Yb-ions).

10. A device for multiplication of repetition frequency in optical pulse trains in claim 4, wherein the optical fibre is one, which is used as a Raman amplifier.

11. A device for multiplication of repetition frequency in optical pulse trains in claim 5, wherein the optical fibre is one, which is used as a Raman amplifier.

12. A device for multiplication of repetition frequency in optical pulse trains in claim 6, wherein the optical fibre is one, which is used as a Raman amplifier.

13. A device for multiplication of repetition frequency in optical pulse trains in claim 1, wherein the optical amplifier is composed of a semiconductor laser amplifier and a current source.

14. A device for multiplication of repetition frequency in optical pulse trains in claim 2, wherein the optical amplifier is composed of a semiconductor laser amplifier and a current source.

15. A device for multiplication of repetition frequency in optical pulse trains in claim 3, wherein the optical amplifier is composed of a semiconductor laser amplifier and a current source.

16. A method for multiplication of repetition frequency in optical pulse trains composed of optical fibres, an optical amplifier and a modulator for optical modulation, and an electric signal generator generating high frequency signals, wherein, the modulator makes an optical pulse train of repeating frequency of $f_m$, when applying electric signals of frequency of $f_m$ to the modulator, comprising:

the optical pulse generator comprising a filter which can pass integer multiple frequencies of the applied modulation frequency $f_m$, and a composite cavity composed of a plurality of optical fibres of which lengths are different from each other, wherein, as a resonant frequency $f_{c1}$ of the fibre ring of the long cavity of the composite cavity and a resonant frequency $f_{c2}$ of the fibre ring of the short cavity of the composite cavity, a lowest common multiple frequency $$f'_{composite}$$

of $f_{c1}$ and $f_{c2}$, and as frequency $K \times f_m$ (K:integer) which passes through the filter, the frequency $$f'_{composite}$$

is integer multiple of $K \times f_m$; and generating pulse trains of the repetition frequencies of $P \times K \times f_m$ (P: integer.).

17. A method of pulse repetition frequency multiplication in optical pulse trains in claim 16, wherein the filter is a Fabry-Perot filter.

18. A method for multiplication of repetition frequency in optical pulse trains in claim 16, wherein the modulator is a Mach-Zehnder intensity modulator which is biased at a voltage which is at the quadrature point on its transfer characteristic curve to generate sidebands of the modulation frequency.

19. A method for multiplication of repetition frequency in optical pulse trains in claim 16, wherein the optical amplifier is composed of an optical fibre having optical amplifying characteristics, and an excitation optical signal source.

* * * * *